United States Patent [19]

Hein et al.

[11] 4,139,286

[45] Feb. 13, 1979

[54] APPARATUS FOR CONCENTRATING SOLAR ENERGY

[76] Inventors: Leopold A. Hein, Rte. 7, Fayetteville, Tenn. 37334; William N. Myers, 4306B Boxwood Ct., Huntsville, Ala. 35805

[21] Appl. No.: 653,872

[22] Filed: Jan. 30, 1976

[51] Int. Cl.² ........................... G03B 21/00; F24J 3/02
[52] U.S. Cl. ......................................... 353/3; 126/270; 350/83
[58] Field of Search ................... 126/270, 271; 353/3; 350/83

[56] References Cited

U.S. PATENT DOCUMENTS

| 333,769 | 1/1886 | Mayer | 353/3 |
|---|---|---|---|
| 507,999 | 11/1893 | Davis | 353/3 |
| 2,022,144 | 11/1935 | Nicolson | 353/3 |
| 3,877,800 | 4/1975 | Liddell | 353/99 |

FOREIGN PATENT DOCUMENTS 29106  1964  Fed. Rep. of Germany ............. 350/83

Primary Examiner—Steven L. Stephan
Attorney, Agent, or Firm—George J. Porter; John R. Manning; L. D. Wofford, Jr.

[57] ABSTRACT

The invention relates to apparatus for collecting solar radiation rays and for converting the radiation rays into a concentrated beam of parallel rays having a fixed orientation. The apparatus includes an optical system for collecting and concentrating the solar radiation rays and for converting the rays into concentrated beam of parallel rays. A system of mirrors is utilized to provide a concentrated beam of parallel rays which remain fixed in orientation as the optical system is rotated around a tracking axis. The concentrated beam of fixed orientation is then utilized for supplying thermal energy to a stationary solar appliance.

6 Claims, 10 Drawing Figures

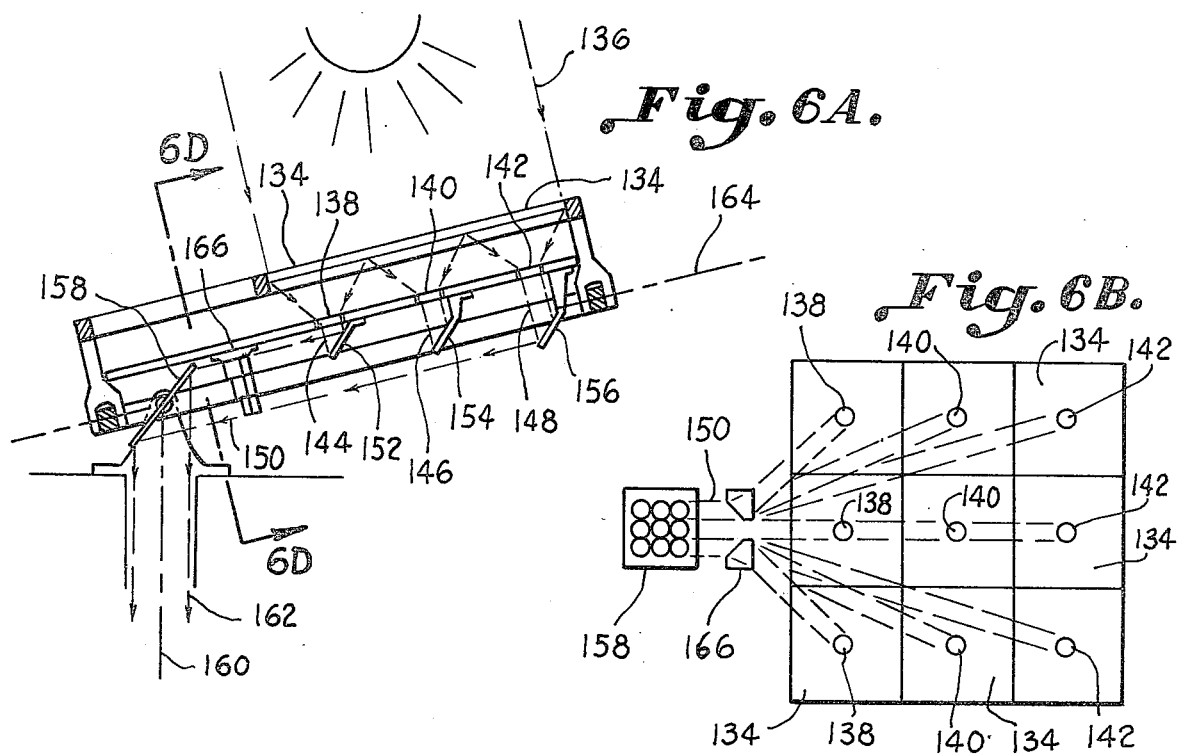
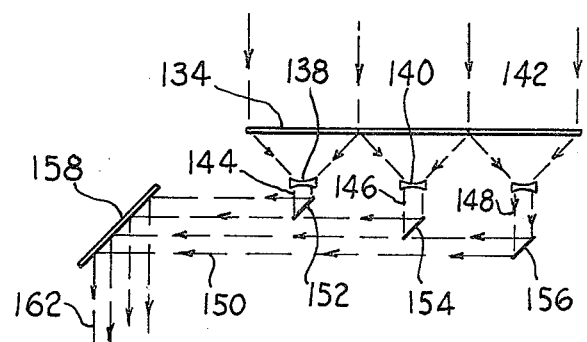
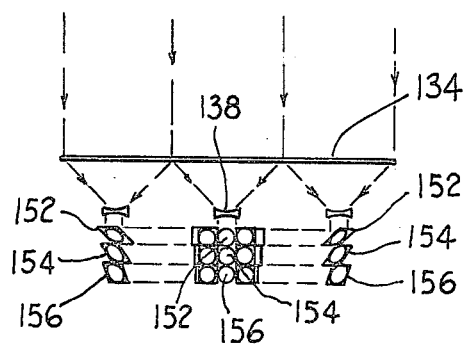
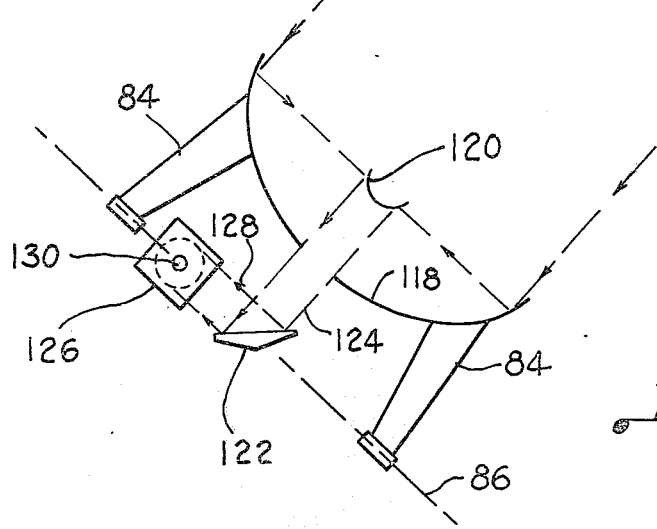

APPARATUS FOR CONCENTRATING SOLAR ENERGY

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

Utilization of tracking apparatus, including rotation of mirrors or reflectors about two axes, for concentrating solar energy is known in the art such as shown in U.S. Letters Pat. No. 3,713,727. Concentrated solar radiation rays have also been utilized in heating devices commonly referred to as heliostat devices having a lens system for supplying a concentrated beam of energy to an associated solar heater. However, in such prior known devices, the solar heater is required to move with the lens system as the path of the sun is tracked during the day. This presents a problem when it is desired to use the concentrated beam for supplying thermal energy to an associated solar stove or furnace which is stationary, such as within the interior space of a home. Since the concentrated beam of solar radiation in such prior devices moves with the lens system, such is impractical for use in residential buildings for supplying heat to cooking or heating appliances.

SUMMARY OF THE INVENTION

Apparatus is provided for converting concentrated solar radiation into a beam of fixed orientation for supplying thermal energy to an associated stationary solar appliance. The apparatus comprises an optical system having a primary lens assembly and a secondary lens assembly for collecting and concentrating solar radiation rays and converting the radiation rays into a beam of parallel rays of radiation. Tracking means is provided for rotating the optical system about a tracking axis to follow the path of the sun during the day. A first mirror member receives the beam of parallel rays and reflects a first beam along the tracking axis. The first beam rotates about the tracking axis as the optical system tracks the sun. A second mirror member receives the first beam from said first mirror member and reflects a second beam along a latitude adjustment axis perpendicular to the tracking axis. Thus, the second beam remains fixed along the latitude adjustment axis as the optical system rotates about the daily and seasonal tracking axes providing a beam of fixed orientation to be directed to the solar appliance for supplying thermal energy thereto.

Accordingly, an important object of the present invention is to provide apparatus for producing a concentrated beam of solar radiation having a fixed orientation.

Another important object of the present invention is to provide an optical system which will produce a fixed concentrated beam of solar radiation and is capable of producing high temperatures for utilization in associated solar appliances permanently mounted within residential structures and the like.

Still another important object of the present invention is to provide apparatus for collecting solar radiation rays and converting the radiation into a concentrated beam having a fixed orientation along either a horizontal or vertical axis for passage through an opening provided in the wall or roof of a residential structure and the like.

Yet another important object of the present invention is to provide apparatus for collecting solar radiation and for converting the radiation into a concentrated beam having a fixed orientation which remains fixed while the optical system of the apparatus tracks the sun about a plurality of axes.

These and other objects and advantages of the present invention will become apparent upon reference to the following specification, attendant claims and drawings.

BRIEF DESCRIPTION OF THE DRAWING

FIG. 5 is a schematic side elevational view illustrating an alternate embodiment of apparatus for collecting and concentrating solar radiation into a fixed horizontal beam, constructed in accordance with the present invention, FIG. 6A is a sectional side elevational view illustrating an alternate embodiment of apparatus for collecting and concentrating solar radiation into a fixed vertical beam constructed in accordance with the present invention, FIG. 6B is a top plan view of the apparatus illustrated in FIG. 6A, FIG. 6C is a schematic side elevational view of the apparatus of 6A with parts omitted for purposes of clarity, and FIG. 6D is a sectional view taken along line 6D—6D of FIG. 6A.

DESCRIPTION OF A PREFERRED EMBODIMENT

Figure 1:
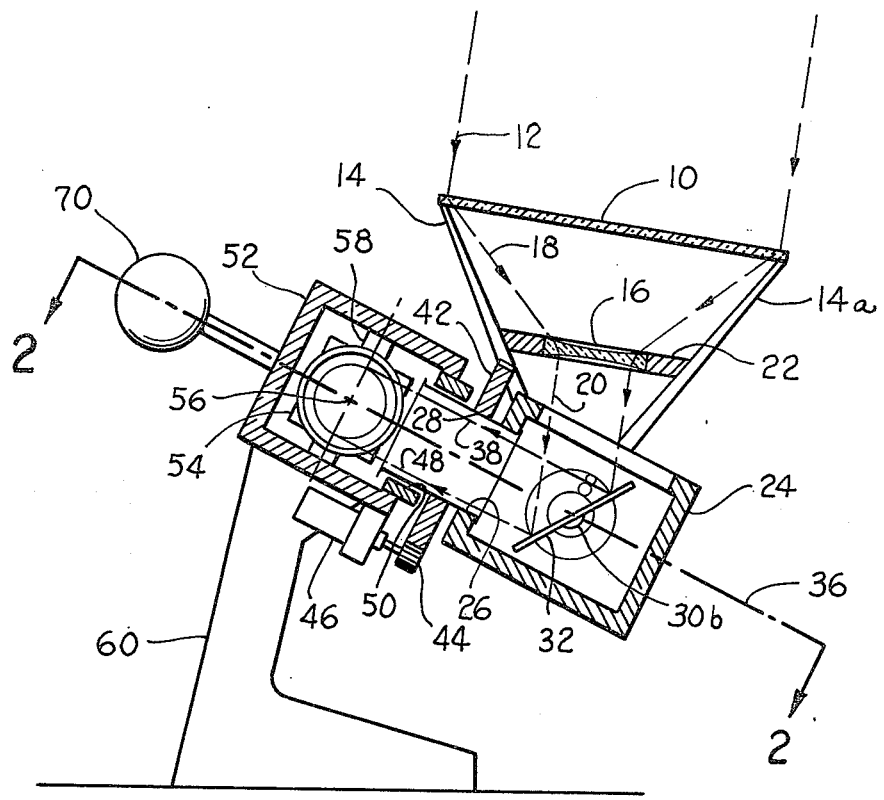
FIG. 1 is a sectional side elevational view of an apparatus for collecting solar radiation rays and converting the radiation into a concentrated beam of fixed orientation, constructed in accordance with the present invention.

The drawings illustrate apparatus for collecting solar radiation rays and for converting the radiation rays into a concentrated beam of parallel rays having a fixed orientation. The apparatus may be utilized for supplying concentrated thermal energy along a fixed axis to a stationary solar appliance such as an oven or heater located in a residential building and the like.

The apparatus includes an optical system having a primary lens assembly 10 for receiving oncoming solar radiation rays 12 which is suitably mounted on a pair of upwardly extending standards 14 and 14a. The optical system further includes a secondary lens assembly 16 which receives radiation rays 18 collected by the primary lens 10 for converting the rays 18 into a concentrated beam of parallel rays 20. The secondary lens assembly 16 is carried by a bracket 22 supported by standards 14 and 14a. A housing 24 has an opening 26 formed in the sidewall thereof. A radiation pipe 28 is affixed within the opening 26 of the housing 24 for supporting the housing 24 thereon. The standards 14 and 14a are suitably affixed to shaft members 30 and 30a extending from the housing 24.

The beam of parallel rays 20 concentrated by the secondary lens 16 impinge on a first mirror member 32 which is carried in the housing 24 on a shaft member 30b. Shaft member 30b is concentric with seasonal axis 34. The mirror member 32 has an angular inclination to the oncoming rays 20. The mirror member 32 reflects the concentrated beam 20 along an axis 36 which is a tracking axis of the optical system providing a first concentrated beam 38 of parallel rays directed along the tracking axis 36. The shaft member 30b is affixed to shaft members 30 and 30a through gears 40, 40a, 40b, and 40c.

The tracking axis 36 is a daily tracking axis to compensate for the changes in the position of the sun during the daylight hours. A gear 42 is adapted to be received over the radiation pipe 28 for affixation thereto. The teeth of gear 42 mesh with a gear 44 carried on the output drive shaft of a daily tracking motor 46. One end 48 of the radiation pipe portion 28 is suitably journaled in an opening 50 formed in an end wall of a housing 52 for rotation therein.

Thus, the tracking motor 46 rotates the radiation pipe 28, the entire optical system including lenses 10 and 16, the housing 24 affixed to the radiation pipe 28, and the mirror member 32 carried within the housing to follow the path of the sun during the daylight hours. The concentrated beam 38 which is directed through the radiation pipe 28 rotates concentrically about the tracking axis 36, but does not change its direction.

A second mirror member 54 receives the concentrated beam 38 from the first mirror member 32 and reflects and redirects the concentrated beam along an axis 56 which is perpendicular to the tracking axis 36. The mirror 54 is carried in the housing 52 on a transverse shaft member 58 and has an angular inclination to the rays of the concentrated beam 38 of forty-five degrees. The housing 52 is supported by a pair of standards 60 having suitable bearing openings 62 formed therein. A radiation pipe having a first portion 64 and a second portion 66 is rotatably journaled in the respective openings 62 of the standards 60 and is affixed in the openings 68 provided in opposing sidewalls of the housing 52.

The standards 14 and 14a which position the primary lens 10 spaced above the secondary lens 16, have lower mounting portions 14b and 14c suitably affixed to shaft members 30 and 30a which are journaled in housing 24 for rotation therein.

The entire optical system including lenses 10 and 16 is rotated about the axis 34 which is a seasonal tracking axis adjusted to compensate for minor changes in the sun's position during the seasons. The optical system including lenses 10 and 16 and the first mirror member 32, through gears 40, 40a, 40b, and 40c, may be manually rotated about the axis 34 to compensate for changes in the sun's position during the various seasons. The gears 40, 40a, 40b, and 40c, are proportioned such that when the optical system including lenses 10 and 16 is rotated, mirror member 32 is rotated but through only half the angle that the optical system was rotated through. The concentrated beam 20 is therefore redirected by mirror member 32 concentric with axis 36 during the various seasons.

A counterweight member 70 is provided to facilitate rotation of the housing 52 and, thus, the mirror member 54 about the axis 56 which is a latitude adjustment axis adjusted to compensate for various latitudes in which the system may be used. The optical system including lenses 10 and 16 and the first mirror member 32 may be manually rotated about the axis 56 to compensate for various latitudes.

The second mirror member 54 reflects and directs a second concentrated beam of parallel rays 72 along the latitude adjustment axis 56 to provide a concentrated beam of fixed orientation which may be supplied to an associated, stationary appliance located in a residential structure and the like. The concentrated beam 72 remains fixed in its direction while the optical system, including lenses 10 and 16, and the first mirror member 32 are rotated about the daily tracking axis 36 and the latitude adjustment axis 56. The concentrated beam 72 also remains fixed in its direction while the optical system, including lenses 10 and 16, is rotated about the seasonal tracking axis 34. The first concentrated beam 38 will rotate concentrically about the tracking axis 36 while the second concentrated beam 72 will rotate concentrically about the latitude adjustment axis 56 as does mirror member 54, but without a change in the direction of the concentrated beam 72.

Figure 2:
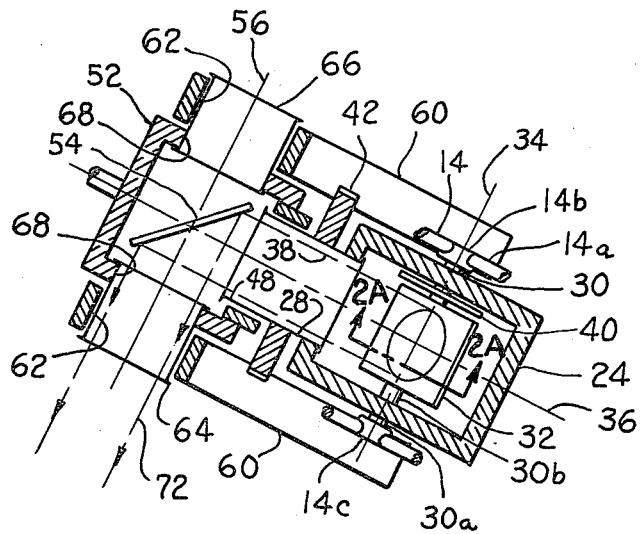
FIG. 2 is a top plan sectional view taken along section line 2—2 of FIG. 1.
Figure 2A:
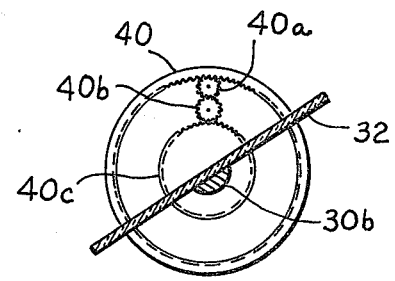
FIG. 2A is an enlarged sectional view taken along section line 2A—2A of FIG. 2.

The use of the advantageous mirror system of the apparatus constructed in accordance with the present invention removes the need for mirror angulation during the day. This is accomplished by placing the mirror members 32 and 54 as illustrated in FIGS. 1 and 2 such that the angles of reflection are constant. It can be seen that the angle of reflection between the reflective beams 20 and 38 will remain constant throughout the day although the optical system is rotated about the tracking axis. The mirror member 32 reflects the second concentrated beam 38 concentric with the tracking axis, thus the beam remains stationary, only rotating concentric with the tracking axis 36 as the optical system, including lenses 10 and 16, collects the solar radiation. The mirror member 54 is fixed in the tracking axis 36 and reflects the beam 38 through ninety degrees in a horizontal direction along the latitude adjustment axis 56. Since the latitude adjustment axis 56 is perpendicular to the daily tracking axis 36, and by locating mirror member 54 such that it reflects the beam 38 concentric with the latitude adjustment axis 56 in the form of beam 72, the beam 72 will remain stationary, but will rotate concentrically about the latitude adjustment axis 56 when latitude adjustment is made without changing the fixed horizontal direction.

In the preferred embodiment, the primary lens 10 is a Fresnel lens, and the secondary lens 16 is any suitable negative lens member. Since the fixed concentrated horizontal beam 72 is always along axis 56 regardless of the position of the tracking optical system including Fresnel lens 10 and negative lens 16, any device that is desired to be heated such as a cooking stove or a heating furnace may be positioned in the path of the concentrated beam. The apparatus shown in FIG. 1 is provided for producing a fixed horizontal beam 72, and therefore, if such were utilized in conjunction with a solar cooking stove or heater, it would be normally mounted on the sidewall of a house. However, if it were desired to mount the device on the roof of the house to provide a fixed vertical beam, the apparatus can be modified such as illustrated in FIG. 3.

Figure 3:
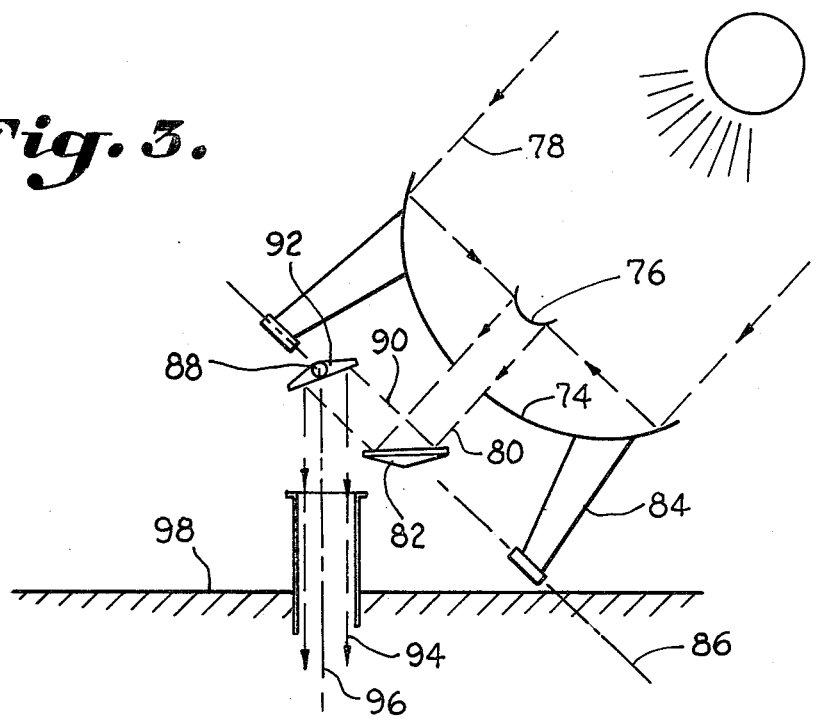
FIG. 3 is a schematic side elevational view of an alternate embodiment of apparatus for collecting and concentrating solar radiation constructed in accordance with the present invention.

The apparatus for collecting and concentrating solar energy illustrated in FIG. 3 includes an optical system having a pair of parabolic mirrors 74 and 76. Mirror 74 provides a primary lens for collecting the solar rays 78 from the sun, and mirror 76 provides a secondary lens for concentrating the rays 78 into a concentrated beam 80 of parallel light rays which impinge on a mirror member 82 which corresponds to the mirror member 32 of FIG. 1. The parabolic mirrors are suitably supported with standoffs on the standards 84, the details of which are omitted since such could be done in any conventional manner. A daily tracking axis 86 and a seasonal tracking axis 88 would correspond to tracking axis 36 and 34 of FIG. 1. The first mirror member 82 receives the concentrated beam 80 from the secondary lens 76 and redirects the concentrated beam in the form of a concentrated beam 90 along the daily tracking axis 86 towards a second mirror member 92 which is mounted on the seasonal tracking axis 88 for producing a second concentrated beam directed along a vertical axis 96 through a roof structure 98 of a residential building and the like.

It is to be understood, of course, that the mounting of the optical lens system and the mirrors could be accomplished in many different ways as long as the mirror member 82 is moved with the parabolic lens system including mirrors 74 and 76, and the mirror 92 is adapted to move for making seasonal adjustments to the position of the sun, in a manner similar to that as shown in FIGS. 1 and 2.

Figure 4:
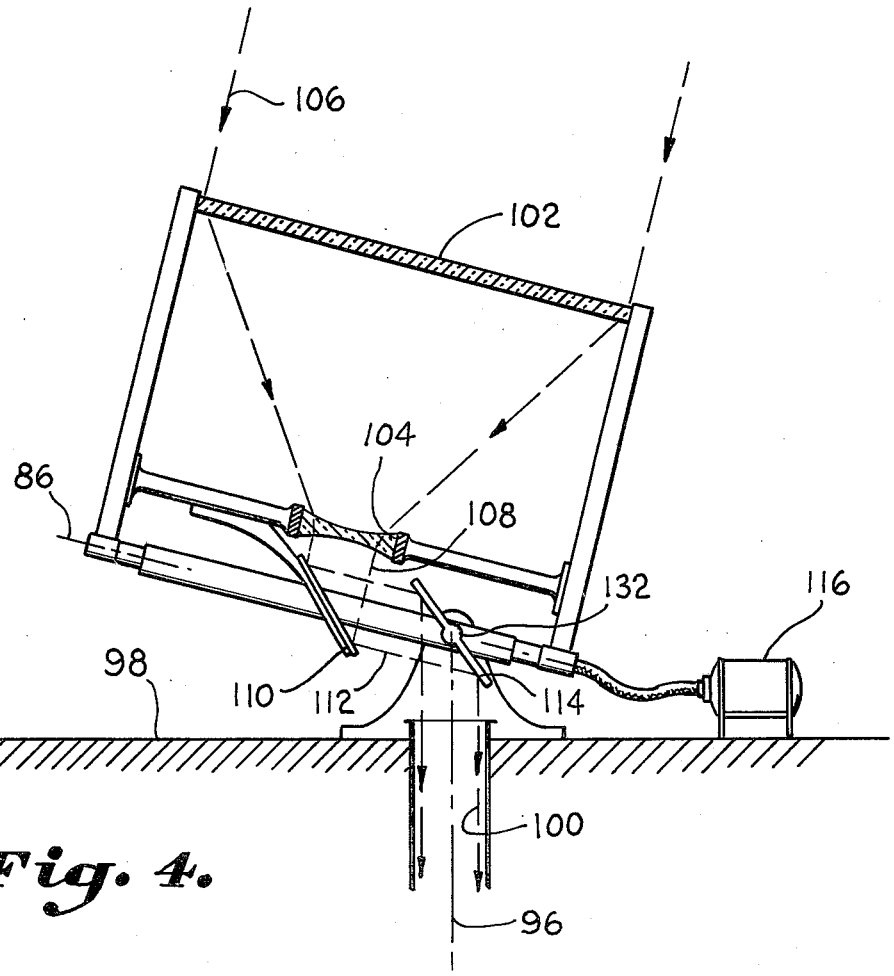
FIG. 4 is a sectional side elevational view illustrating an alternate embodiment of apparatus for collecting and concentrating solar radiation into a fixed vertical beam, constructed in accordance with the present invention.

The apparatus illustrated in FIG. 4 operates in the same manner as that shown in FIG. 3 in that it produces a fixed vertical, concentrated beam of parallel rays 100. Instead of using the two parabolic mirrors 74 and 76, however, a primary Fresnel lens 102 and a secondary negative lens 104 are provided for collecting the solar radiation rays 106 and providing a concentrated beam 108 of parallel solar rays which impinge on a first mirror member 110. The beam is then reflected and redirected by mirror 110 as a concentrated beam 112 of parallel rays to a second mirror member 114 which then redirects the beam to produce the fixed vertical beam 100. A daily tracking motor 116 is provided for rotating the primary lens 102, secondary lens 104 and first mirror member 110 about the daily tracking axis 86.

FIG. 5 illustrates another embodiment of apparatus constructed in accordance with the present invention for producing a fixed horizontal beam of concentrated parallel rays by using a pair of parabolic mirrors 118 and 120. In this particular embodiment, a redirecting mirror 122 is provided to be moved with the parabolic mirrors 118 and 120 for redirecting the concentrated beam 124 produced by the mirrors 118 and 120 towards a second mirror member 126. The second mirror member 126 has an angular inclination of approximately forty-five degrees to the oncoming beam 128 so as to redirect the beam along an axis 130 extending into the paper. The mirror 126 is mounted about the axis 130 which preferably corresponds to a seasonal axis providing seasonal adjustments to the position of the sun in a manner similar to that shown in FIGS. 1–2. The angle between the mirror and the axis always remains the same during the seasonal adjustments so that the fixed horizontal beam reflected therefrom remains fixed in direction.

In the apparatus illustrated in FIGS. 3 and 4, the angle of the mirror members 92 and 114, respectively, has to be altered if the apparatus were rotated about the seasonal axis 88 and 132, respectively. This is because the vertical beam is not directed along the seasonal axis as it is in FIG. 5, therefore, the vertical beam would not remain fixed as seasonal adjustments were made unless the second mirror members 92 and 114 are altered accordingly. However, in some applications, it may not be necessary to compensate for seasonal changes.

In many applications it is not practical to provide a single Fresnel lens due to the size of the desired surface area. In order to provide a lens system which operates in substantially the same manner as the large Fresnel lens, a plurality of smaller lenses can be combined as shown in FIG. 6A through 6D to provide a composite lens producing a concentrated beam in a similar manner as a single lens. This would require the placing of individual lenses 134 in a matrix arrangement such as illustrated in FIG. 6B for collecting the solar radiation rays 136 which are then focused on a plurality of secondary, negative lenses 138, 140 and 142 arranged in lateral rows as shown in FIG. 6B. The secondary lenses concentrate the rays into a plurality of parallel beams 144, 146 and 148, respectively. A concentrated beam 150 is then produced by the total reflection of a plurality of angulated mirrors 152, 154 and 156 arranged in rows corresponding to the rows of the lenses 138, 140 and 142. The concentrated beam 150 is directed to a mirror member 158 which reflects and redirects the beam along a vertical axis 158 to produce a fixed vertical beam 162 of concentrated solar rays for supplying thermal energy to an associated solar appliance.

The concentrated beam 150 is directed along an axis 164 (FIG. 6A) which corresponds to the daily tracking axis of the optical system which may be provided in any conventional manner to compensate for daily changes in the position of the sun.

In such a matrix arrangement of the mirrors 134 the diagonal beam produced by the outside angulated mirrors 152, 154, and 156 must be directed through prisms 166 to bring the beams into parallel alignment with the beams produced by the center row of angulated mirrors (see FIGS. 6B and 6D).

Thus, it can be seen that an advantageous construction can be had with the apparatus of the present invention for collecting solar radiation rays and concentrating the rays into a single beam of parallel rays which is then converted into a concentrated beam having a fixed orientation which remains fixed as the optical system of the apparatus is rotated about either a single axis or a plurality of axes in tracking the position of the sun.

While a preferred embodiment of the invention has been described using specific terms, such description is for illustrative purposes only, and it is to be understood that changes and variations may be made without departing from the spirit or scope of the following claims.

What is claimed is:

1. Apparatus for converting concentrated solar radiation into a beam of fixed orientation for supplying thermal energy to an associated solar appliance comprising:
   an optical system having a primary lens assembly and a secondary lens assembly for collecting and concentrating solar radiation rays and converting said radiation rays into a beam of parallel rays of radiation;
   said primary lens assembly including a plurality of individual lenses arranged in a common plane in the form of a matrix to produce a composite Fresnel lens;
   said secondary lens assembly including a plurality of secondary associated lenses arranged in a matrix form corresponding to that of said primary lenses mounted in a spaced parallel plane below the plane of said primary lenses;

tracking means for rotating said optical system about a daily tracking axis to follow the path of the sun during the day and about a seasonal tracking axis to adjust for seasonal changes in the sun's position;

a first mirror member for receiving said beam of parallel rays and reflecting a first beam along said daily tracking axis, said first beam rotating concentrically about said daily tracking axis as said optical system tracks the sun;

a second mirror member inclined at an angle of forty-five degrees to said first beam for reflecting a second beam along a second axis perpendicular to said daily tracking axis and parallel with said seasonal tracking axis;

said second beam being reflected in a substantially horizontal direction and rotating concentrically about said second axis as said optical system rotates about said daily and seasonal tracking axes so that said second beam remains fixed along said second axis as said optical system is rotated about said tracking axes providing a beam of fixed orientation to be directed to said solar appliance for supplying thermal energy thereto.

2. The apparatus set forth in claim 1 wherein said primary lens assembly includes a Fresnel lens.

3. The apparatus set forth in claim 1 wherein said optical system is carried by a tubular radiation pipe through which said first beam is directed, and wherein said second axis is defined by a latitude adjustment axis perpendicular to said tracking axis.

4. The apparatus set forth in claim 3 further comprising a housing mounted for rotation about said latitude adjustment axis, said second mirror member being carried in said housing.

5. The apparatus set forth in claim 4 wherein said tubular radiation pipe has one end rotatably carried in said housing.

6. The apparatus of claim 1 wherein said first mirror member comprises a plurality of individual angulated mirrors receiving said plurality of concentrated beams from associated secondary lenses to produce a single concentrated beam of parallel rays.

* * * * *